US007363470B2

(12) United States Patent
Filippo et al.

(10) Patent No.: US 7,363,470 B2
(45) Date of Patent: Apr. 22, 2008

(54) SYSTEM AND METHOD TO PREVENT IN-FLIGHT INSTANCES OF OPERATIONS FROM DISRUPTING OPERATION REPLAY WITHIN A DATA-SPECULATIVE MICROPROCESSOR

(75) Inventors: Michael A. Filippo, Manchaca, TX (US); James K. Pickett, Austin, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 717 days.

(21) Appl. No.: 10/429,082

(22) Filed: May 2, 2003

(65) Prior Publication Data
US 2004/0221139 A1 Nov. 4, 2004

(51) Int. Cl.
G06F 9/30 (2006.01)
(52) U.S. Cl. .................................... 712/218
(58) Field of Classification Search ............. 712/218
See application file for complete search history.

(56) References Cited

U.S. PATENT DOCUMENTS

| | | | | |
|---|---|---|---|---|
| 5,966,544 A * | 10/1999 | Sager | ............... | 712/32 |
| 6,094,717 A * | 7/2000 | Merchant et al. | ............. | 712/32 |
| 6,212,626 B1 | 4/2001 | Merchant et al. | | |
| 6,665,792 B1 * | 12/2003 | Merchant et al. | ........... | 712/219 |
| 6,704,841 B2 | 3/2004 | Chaudhry et al. | | |
| 6,718,839 B2 | 4/2004 | Chaudhry et al. | | |
| 6,735,688 B1 | 5/2004 | Upton et al. | | |
| 6,877,086 B1 * | 4/2005 | Boggs et al. | ............... | 712/218 |
| 6,952,764 B2 * | 10/2005 | Sager et al. | ................ | 712/218 |
| 2002/0062426 A1 | 5/2002 | Gomez et al. | | |

(Continued)

FOREIGN PATENT DOCUMENTS

WO 00/41070 7/2000

(Continued)

OTHER PUBLICATIONS

International Search Report and Written Opinion, PCT/US2004/000482, mailed Aug. 19, 2005, 13 pages.

(Continued)

*Primary Examiner*—Alford Kindred
*Assistant Examiner*—Benjamin P. Geib
(74) *Attorney, Agent, or Firm*—Robert C. Kowert; Meyertons, Hood, Kivlin, Kowert & Goetzel, P.C.

(57) ABSTRACT

A microprocessor may include one or more functional units configured to execute operations, a scheduler configured to issue operations to the functional units for execution, and at least one replay detection unit. The scheduler may be configured to maintain state information for each operation. Such state information may, among other things, indicate whether an associated operation has completed execution. The replay detection unit may be configured to detect that one of the operations in the scheduler should be replayed. If an instance of that operation is currently being executed by one of the functional units when operation is detected as needing to be replayed, the replay detection unit is configured to inhibit an update to the state information for that operation in response to execution of the in-flight instance of the operation. Various embodiments of computer systems may include such a microprocessor.

26 Claims, 6 Drawing Sheets

U.S. PATENT DOCUMENTS

2002/0087849 A1 7/2002 Arimilli et al.
2003/0061467 A1* 3/2003 Yeh et al. .................. 712/217
2004/0078558 A1* 4/2004 Sprangle .................... 712/229
2004/0221139 A1 11/2004 Filippo et al.

FOREIGN PATENT DOCUMENTS

WO 02/42902 5/2002

OTHER PUBLICATIONS

"Cyclone: A Broadcase-Free Dynamic Instruction Scheduler with Selective Replay," Ernst, et al., ACM SIGARCH Computer Architecture News, vol. 31, Issue 2, May 2003, 10 pages.

"Speculation Techniques for Improving Load Related Instruction Scheduling," 26th Annual International Symposium on Computer Architecture, 1999, 12 pages.

* cited by examiner

SYSTEM AND METHOD TO PREVENT IN-FLIGHT INSTANCES OF OPERATIONS FROM DISRUPTING OPERATION REPLAY WITHIN A DATA-SPECULATIVE MICROPROCESSOR

BACKGROUND OF THE INVENTION

1. Field of the Invention

This invention is related to the field of microprocessors and, more particularly, to performing data speculation in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation is data speculation, which predicts data values. Proposed types of data speculation include speculatively generating addresses for memory operations and speculatively generating data values for use in computational operations. As with control speculation, the underlying conditions used to speculative generate a value are eventually evaluated, allowing the speculation to be verified or undone.

Since speculation allows execution to proceed without waiting for dependency checking to complete, significant performance gains may be achieved if the performance gained from correct speculations exceeds the performance lost to incorrect speculations. Decreasing the performance penalties due to incorrect speculations is therefore desirable.

SUMMARY

Various embodiments of methods and systems for preventing in-flight instances of operations from disrupting operation replay within a data-speculative microprocessor are disclosed. In some embodiments, a microprocessor may include one or more functional units configured to execute operations, a scheduler configured to issue operations to the functional units for execution, and at least one replay detection unit. The scheduler may be configured to maintain state information for each operation. Such state information may, among other things, indicate whether an associated operation has completed execution. The replay detection unit may be configured to detect that one of the operations in the scheduler should be replayed. If an instance of that operation is currently being executed by one of the functional units when operation is detected as needing to be replayed, the replay detection unit is configured to inhibit an update to the state information for that operation in response to execution of the in-flight instance of the operation. Various embodiments of computer systems may include such a microprocessor.

In one embodiment, the replay detection unit may be configured to inhibit the update to the state information for the operation by causing the functional unit executing the in-flight instance of the operation to not signal completion of operation to the scheduler. In another embodiment, the replay detection unit may be configured to inhibit the update to the state information for the operation by causing the scheduler to modify an issue count associated with that operation. The scheduler may be configured to not update the state information in response to completion of the instance of the operation if the issue count of the operation does not match the issue count of the instance of the operation.

In some embodiments, the scheduler may be configured to update the state information associated with an operation to indicate that the operation needs to be reissued if a data speculation verification unit detects incorrect data speculation for that operation. If an instance of that operation is being executed when the incorrect data speculation is detected, the replay detection unit may be configured to ensure that the state information associated with that operation continues to indicate that the operation needs to be reissued after execution of the instance of operation.

In some embodiments, a microprocessor may include several replay detection units. Replay detection units may be included in data speculation verification units (e.g., in a load store unit or other functional unit or in a memory controller) or in the scheduler itself.

Embodiments of a method may involve: issuing an instance of an operation for execution; subsequent to issuing the instance of the operation, receiving an indication that the operation should be replayed; and in response to the indication, inhibiting an update to a state of the operation in a scheduler in response to completion of the instance of the operation. Inhibiting the update may involve causing a functional unit executing the instance of the operation to not signal completion of the instance of the operation to the scheduler. Alternatively, inhibiting the update may involve: the scheduler modifying an issue count associated with the operation in response to receiving the indication that the operation should be replayed; and the scheduler not updating the state information associated with the operation in response to completion of the instance of the operation if the issue count of the operation does not match an issue count of the instance of the operation.

BRIEF DESCRIPTION OF THE DRAWINGS

A better understanding of the present invention can be obtained when the following detailed description is considered in conjunction with the following drawings, in which.

Figure 1:
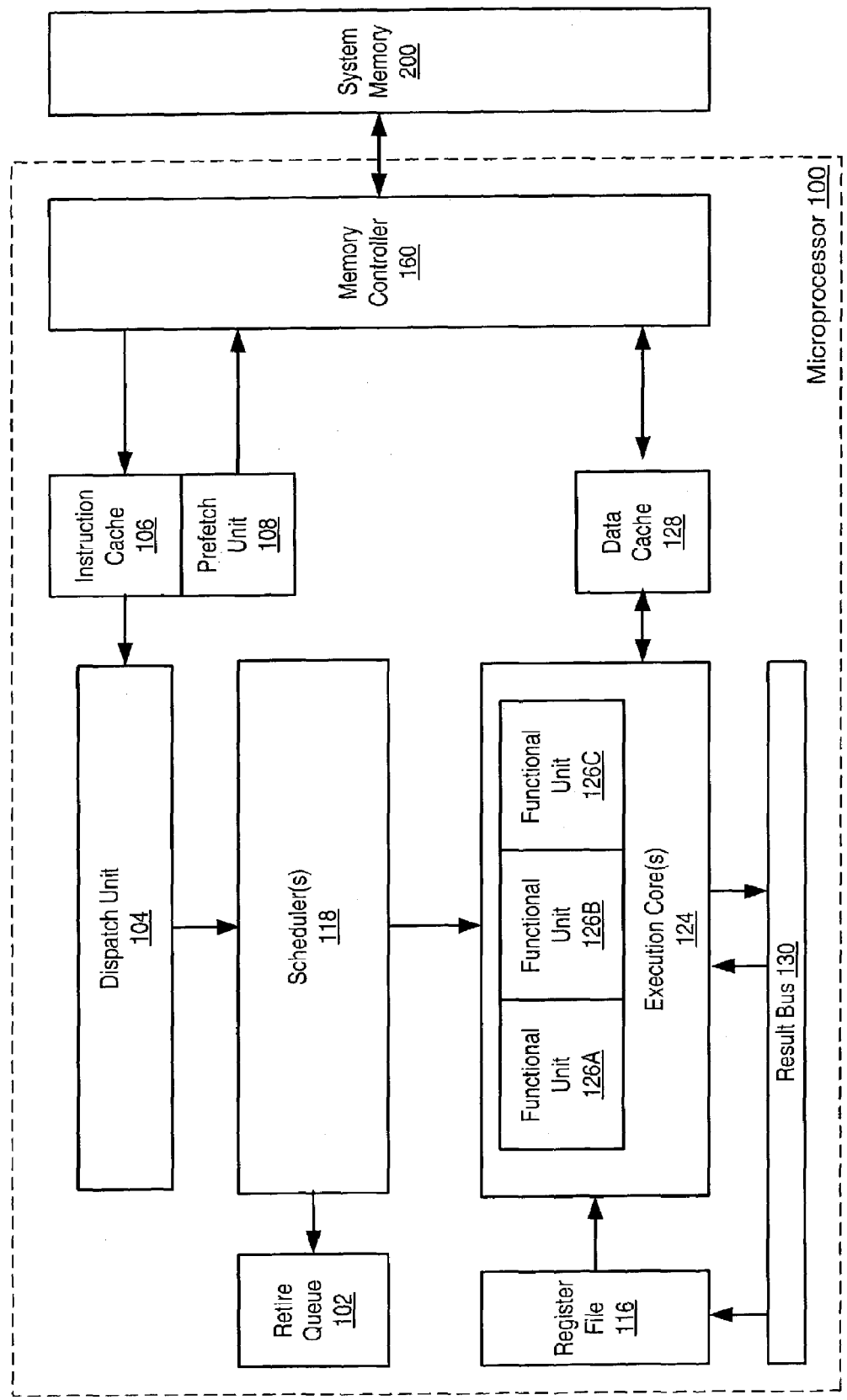
FIG. 1 shows a microprocessor, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may each include a load/store unit configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue 102 may be configured to determine when each issued operation may be retired. In one embodiment, the microprocessor 100 may be designed to be compatible with the x86 architecture. Note that microprocessor 100 may also include many other components. For example, microprocessor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped). In some embodiments, there may be multiple levels of instruction and/or data cache 106 and 128. Some levels may be integrated with the microprocessor 100, as shown, while other levels of cache may be external to the microprocessor.

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data, and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. If an operation involves the update of a register, a register location within register file 116 may be reserved (e.g., upon decode of that operation) to store speculative register states (in an alternative embodiment, a reorder buffer may be used to store one or more speculative register states for each register). A register map may translate logical register names of source and destination operands to physical register names in order to facilitate register renaming. A register map may track which registers within register file 116 are currently allocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. Retire queue 102 may be implemented in a first-in-first-out configuration in which operations move to the "bottom" of the buffer as they are validated, making room for new entries at the "top" of the queue. Retire queue 102 may retire an operation in response to that operation completing execution and any data or control speculation performed on any operations, up to and including that operation in program order, being verified. Retire queue 102 may commit the speculative state of a physical register to the architectural state of microprocessor 100 when the operation that generated the value in that physical register is retired. In some embodiments, retire queue 102 may be implemented as part of a reorder buffer. Such a reorder buffer may also provide data value storage for speculative register states in order to support register renaming. Note that in other embodiments, retire queue 102 may not provide any data value storage. Instead, as operations are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

If a required operand of a particular operation is a register location, register address information may be routed to a register map (or a reorder buffer). For example, in the xb 86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that is determined to modify the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Dispatch unit 104 may determine that register file 116 has one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more functional units. For example, a reservation station is a scheduler. Operations in a scheduler or group of schedulers may also be referred to as operations in an instruction or operation window or scheduling window. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by functional units 126 (from register file 116 or result bus 130). In some embodiments, each scheduler 118 may be associated with a dedicated functional unit 126. In other embodiments, a single scheduler 118 may issue operations to more than one of the functional units 126.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect.

In one embodiment, each of the execution core(s) 124 may include several functional units 126 (e.g., functional units 126A-126C, as shown in FIG. 1). Some functional units, e.g., 126A, may be configured to perform integer arithmetic operations of addition and subtraction, as well as shifts, rotates, logical operations, and branch operations. Other functional units, e.g., 126B, may be configured to accommodate floating point operations. One or more of the functional units, e.g., 126A, may be configured to perform address generation for load and store memory operations to be performed by a functional unit, e.g., 126C, that performs load and store operations to access data stored in data cache 128 and/or system memory. In one embodiment, such a functional unit 126C may be configured with a load/store buffer with several storage locations for data and address information for pending loads and/or stores.

One or more functional units 126 may also provide information regarding the execution of conditional branch instructions to a branch prediction unit so that if a branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116.

Results produced by functional units 126 within execution core(s) 124 may be output on the result bus 130 to the register file 116 if a register value is being updated. If the contents of a memory location are being changed, the results produced within execution core(s) 124 may be provided to the load/store unit 126C.

Data cache 128 is a cache memory provided to temporarily store data being transferred between execution core(s) 124 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

In some embodiments, a microprocessor 100 may include an integrated memory controller 160, allowing the microprocessor to interface directly to system memory 200. In other embodiments, memory controller 160 may be included in a bus bridge that indirectly couples microprocessor 100 to system memory 200.

Data Speculation

As described herein, a data value is speculative if there is a possibility that the data value may found to be incorrect and consequentially recomputed. A speculative data value is one that cannot be identified with certainty as being correct or incorrect. A data value may be recomputed if that data value is the result of an operation for which some data speculation has been performed or if the data value depends on another speculative data value (e.g., if the data value is generated as the result of an operation having one or more speculative operands).

Various mechanisms within a microprocessor 100 may perform data speculation. For example, dispatch unit 104, memory controller 160, and/or one or more functional units 126 may each perform data speculation for a particular operation. Dispatch unit 104 may detect that a result of one operation may be used as a speculative operand for another operation. For example, dispatch unit may predict that a load operation will access data stored to data cache 128 by a prior store operation. The dispatch unit 104 may responsively identify the data value stored in the register used as the source of the store operation as the speculative result of the load operation. This type of data speculation is referred to herein as dependency prediction. Dependency prediction may be extended in the dispatch unit 104 by linking the source of the store operation as a speculative operand source for operations specifying the result of the load operation as an operand. Another type of dependency prediction may be performed in load store unit 126C by allowing loads to bypass stores with uncomputed addresses, i.e., by predicting that younger loads are not dependent on earlier stores.

In a multiprocessor system, memory controller 160 may perform coherency checks to maintain cache coherency. Memory controller 160 may speculatively return a copy of a cache line from system memory 200 before coherency checks with other microprocessors' caches are complete. If the coherency checks subsequently determine that the correct copy of the cache line to retrieve is currently stored in another processor's cache, the copy of the cache line speculatively retrieved from system memory 200 may be invalidated. Accordingly, any load operation results generated from accessing that cache line will be speculative until the coherency checks finish. This type of speculation is referred to herein as memory prediction.

Dispatch unit 104 may perform data speculation by predicting the result of an operation. For example, some operations may tend to generate the same result, and thus each time one of those operations is handled, the result may be speculatively generated by dispatch unit 104 prior to actual execution of the operation by a functional unit 126. This type of data speculation is referred to herein as data prediction. Note that data prediction may also be performed in other portions of the microprocessor (e.g., in a load store unit 126C).

A load store unit 126C may speculatively generate the address and, based on the speculative address, result of a load instruction whose address has not yet been computed based on a pattern of earlier-handled loads. For example, if the previous N load operations have targeted addresses A1-AN that are spaced by a constant offset C from each other (e.g., A1, A2=A1+C, ..., AN=A(N−2)+C), the load store unit 126C may speculatively return the data at the most recently accessed address AN plus the constant offset C as the result of the load operation. This type of data speculation is referred to herein as address prediction. Note that other forms of address prediction may be employed in many embodiments.

Operations that depend on the results of operations on which data speculation has been performed may also generate speculative results. For example, if address prediction is used to generate the speculative result of a load operation, any dependent operations that execute using the load's speculative result as an operand may produce speculative results, which may in turn be used as operands by other dependent operations. Accordingly, if the underlying speculation in the load operation is determined to be incorrect, the dependent operations' results may also be incorrect, and thus the entire dependency chain of operations dependent on that load may need to be re-executed in order to produce correct results. On the other hand, if the underlying speculation is found to be correct, the dependent operations' results may be correct (assuming those results are not based on any other speculative values).

Many operations for which data speculation has been performed may be verified when those operations are executed by a functional unit. For example, the data prediction used to speculatively generate the result an operation may be verified by the functional unit 126 that executes that operation by comparing the actual result of the operation with the speculative result. Such operations may not need to be re-executed if the data speculation is incorrect, since the correct result is already available. Other operations may be verified without being completely executed. For example, if a load with an uncomputed address forwarded its result from an earlier store (e.g., due to dependency or address prediction), the speculative result of the load may be verified when the load address is calculated. If the data speculation is incorrect, such an operation may need to be re-executed (at least partially) in order to generate the correct result.

Since operations for which data speculation has been performed and their dependent operations may need to be re-executed, retire queue 102 may be configured to only retire operations for which any underlying data speculation has resolved. The various components within microprocessor 100 that are configured to verify one or more types of data speculation are referred to herein as data speculation verification units or means for verifying data speculation.

Replaying In-Flight Operations

Operations may be replayed due to incorrect data speculation via reissue from a scheduler 118. In order to cause an operation that has already been issued by the scheduler 118 to replay, the state of that operation in scheduler 118 may be modified to indicate that the operation should be reissued. In response to the updated operation state, the scheduler 118 may be configured to reissue the operation to a functional unit 126. The scheduler may also be configured to mark an operation for replay if source data for the operation is broadcast on result bus 130 and that operation has already been issued. An operation's source data may be rebroadcast due to executing or re-executing an operation for which incorrect data speculation was detected. Generally, the need to replay an operation may be detected by a data speculation verification unit that detects incorrect data speculation for an operation and that the operation needs to be re-executed or by a scheduler that detects that the operation is part of a dependency chain needing to be replayed due to incorrect data speculation for another operation. Components within microprocessor 100 that detect the need to replay an operation are referred to herein as replay detection units or means for detecting operations that need to be replayed.

Some data-speculative operations may be identified for replay while an instance of that operation is in-flight within a functional unit 126. An in-flight instance of an operation is one which has been issued to a functional unit 126 by scheduler 118 but that has not yet completed execution within that functional unit 126. When the in-flight instance of the operation completes execution, it should not affect the reset state of the operation in the scheduler 118. Otherwise, completion of the in-flight instance of the operation might update the state of the operation in the scheduler to a completed state, causing the scheduler to erroneously fail to reissue that operation. Accordingly, if an in-flight operation is detected as needing to be replayed, the replay detection unit that detects the need for replay may be configured to inhibit the ability of the in-flight instance of that operation to update that operation's state within the scheduler 118.

Figure 2:
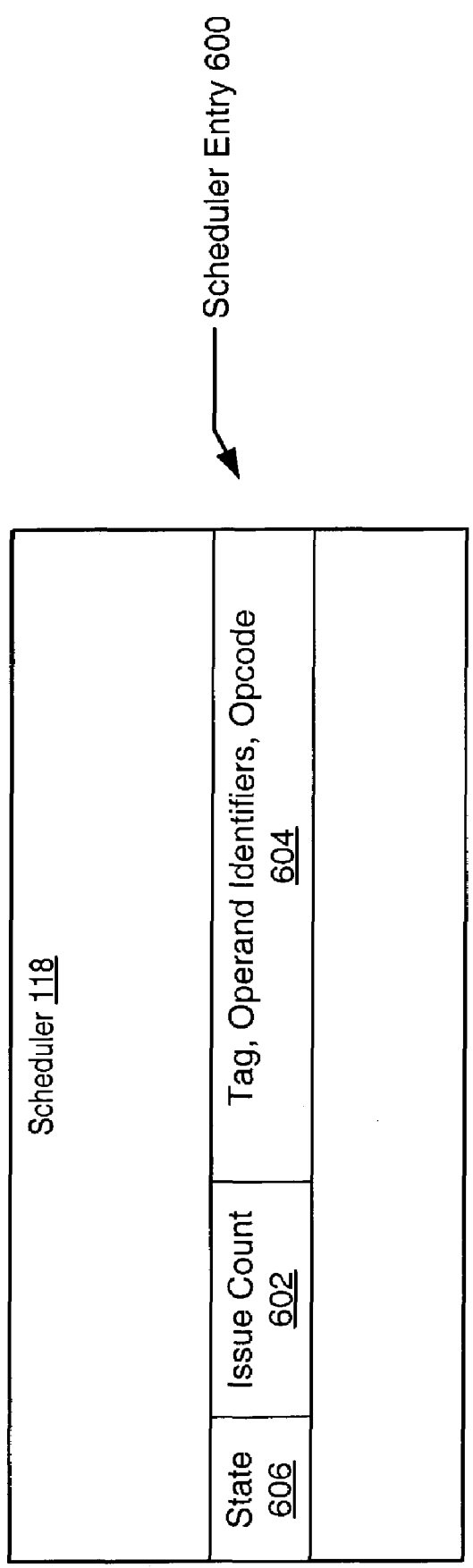
FIG. 2 illustrates a scheduler, according to one embodiment.

In one embodiment, each replay detection unit may be configured to update an issue count stored in the scheduler entry associated with an operation in response to detecting that data speculation for that operation is incorrect. FIG. 2 illustrates one embodiment of a scheduler 118 that includes a scheduler entry 600. Scheduler entry 600 includes storage 604 for an operation's tag, operands identifiers (and/or operands, in some embodiments), and opcode. Scheduler entry 600 also includes storage for state information 606 related to the operation and an issue count 602. Upon receiving an indication that an operation should replay (e.g., due to one of that operation's operands being rebroadcast on result bus 130 or a data speculation verification unit indicating that data speculation performed for that operation is incorrect), the scheduler 118 may increment the issue count associated with that operation. When the scheduler 118 initially allocates an entry to an operation, the issue count for that operation may be set to a minimum value (e.g., zero).

When the scheduler 118 issues operations for execution to a functional unit 126, the scheduler may provide the issue count associated with that operation to the functional unit 126. Each functional unit 126 may be configured to broadcast the issue count when broadcasting the result of the operation. The functional units 126 may handle the issue count as part of that operation's tag, and the issue count may have no effect on the handling of the operation within a particular functional unit. However, when the scheduler 118 sees the result of the operation broadcast (e.g., when the result value and the issue count and tag of the operation and/or its result operand are broadcast on result bus 130), the scheduler 118 may be configured to compare the issue count associated with that instance of the operation to the issue count currently stored in that operation's scheduler entry 600. If the two issue count values are not equal, the scheduler 118 may inhibit updating the state of the operation in the scheduler. Accordingly, if the operation's state and issue count were updated in the scheduler 118 subsequent to issue of the operation but prior to completion of execution of the operation, the completion of that operation by a functional unit 126 will not modify the state of the operation within the scheduler. Note that the scheduler 118 may update the issue count for an incorrectly speculated operation regardless of whether that operation is currently in-flight in some embodiments. Other embodiments may limit such updates to operations that are already in-flight.

In some embodiments, if an operation's issue count in the scheduler 118 does not match the issue count broadcast along with the result of an instance of that operation, the scheduler 118 may inhibit issuing any operations that depend on the result of that operation, since the non-equal issue counts indicate that the result of the operation is likely to be incorrect due to incorrect data speculation. However, any dependent operations that execute using the potentially incorrect data value will also be reissued the next time the result of the incorrectly speculated operation is broadcast. Thus, in other embodiments, the scheduler 118 may allow dependent operations to execute using the result of the incorrectly speculated operation, since correctness will still be maintained.

Figure 3:
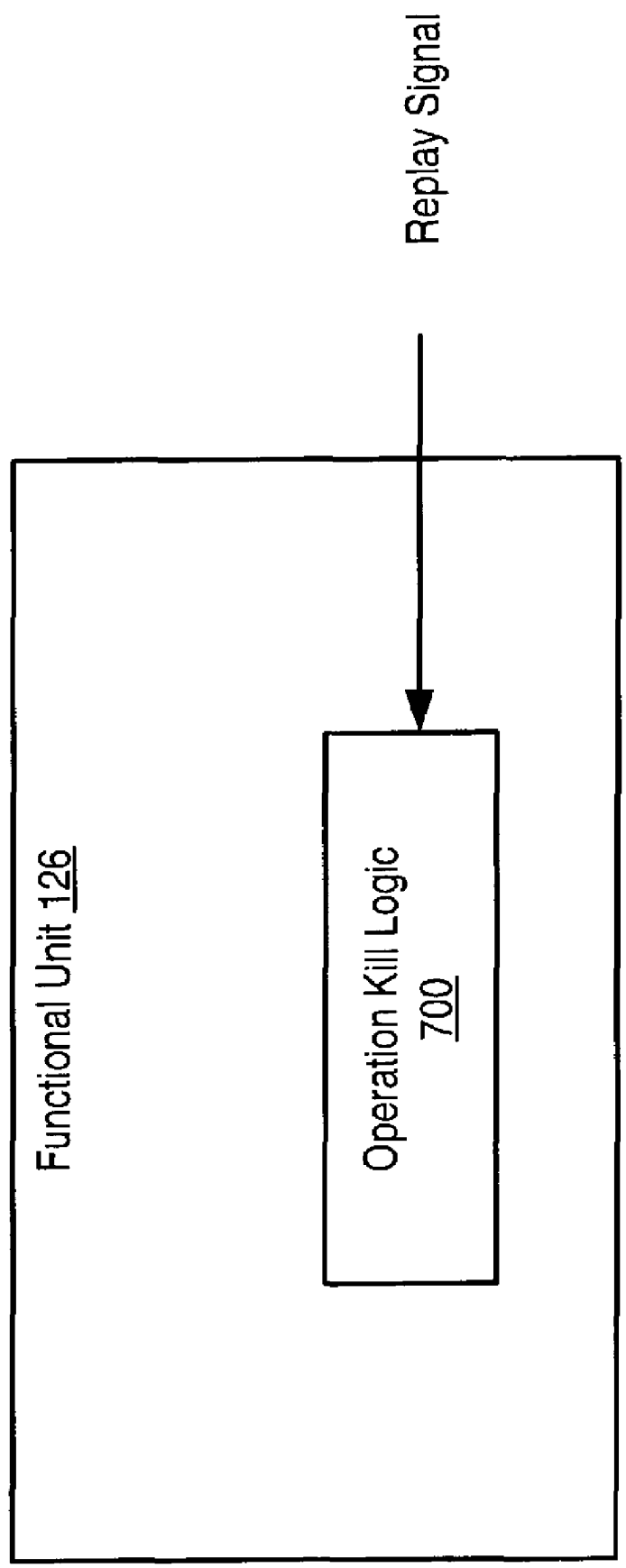
FIG. 3 illustrates a functional unit, according to one embodiment.

Instead of using issue counts in the scheduler, some embodiments may use an operation-kill feature to inhibit updating the state of an operation marked for replay in response to completion of an in-flight instance of that operation. FIG. 3 illustrates a block diagram of a functional unit 126 configured to effectively "kill" in-flight instances of operations that are identified as needing to be replayed. The functional unit 126 kills in-flight instances of operations by preventing any changed state information related to those in-flight instances from being broadcast to the scheduler 118. The functional unit 126 receives one or more signals from replay detection units identifying an issued operation that needs to be replayed. The operation kill logic 700 included in the functional unit 126 may operate to prevent the functional unit 126 from broadcasting information indicating that the state of the operation within the scheduler should be updated. Since the scheduler will therefore not receive an indication that the operation has completed execution, the scheduler 118 will not update the state of the operation within the scheduler.

As in the embodiments using issue counts to inhibit modifying the scheduler state due to completion of an instance of the operation that was issued prior to detection of the need to replay the operation, embodiments implementing operation kill logic 700 may be configured to inhibit issuing dependent operations in response to completion of the in-flight instance. However, since this functionality may not be needed for processor correctness, other embodiments may allow dependent operations to issue and execute using the result generated by the in-flight instance. The next time the operation that was incorrectly speculated issues and executes, any dependent operations may be replayed.

Figure 4A:
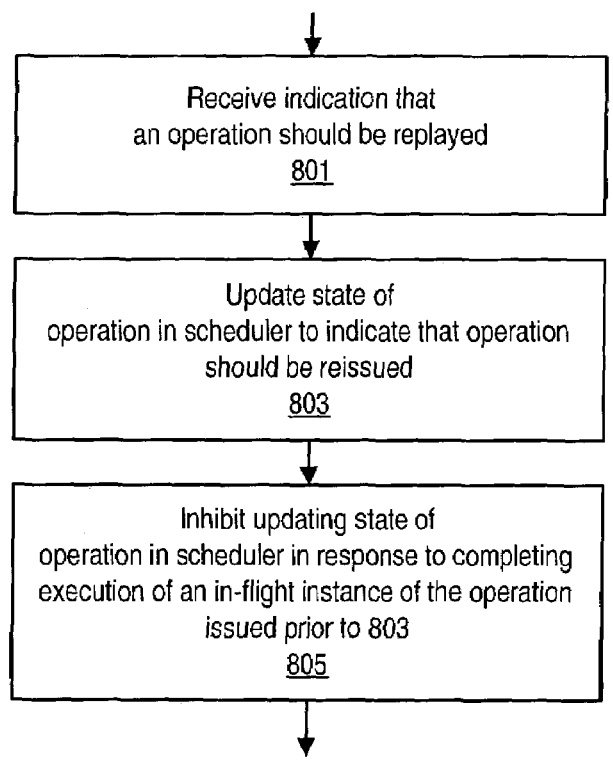
FIG. 4A is a flowchart of a method of inhibiting an update to the state of an incorrectly speculated operation within the scheduler, according to one embodiment.

FIG. 4A illustrates one embodiment of a method of inhibiting updates to the scheduler state of an incorrectly speculated operation due to completion of an instance of that operation that was already in-flight within a functional unit before the incorrect speculation was detected. At 801, an indication is received that an in-flight operation is needs to be replayed. In response to detection of the need to replay the operation, the state of the operation within a scheduler may be reset to indicate that the operation should be reissued, as shown at 803. Additionally, completion of an in-flight instance of the operation that is in-flight when the incorrect speculation is detected is inhibited from updating the state of the operation within the scheduler, as indicated at 805. Function 805 may be implemented by effectively killing the in-flight instance of the operation within a functional unit currently executing that operation or by using a mechanism (e.g., an issue count) in the scheduler to differentiate instances of operations, such as the one described with respect to FIG. 4B.

Figure 4B:
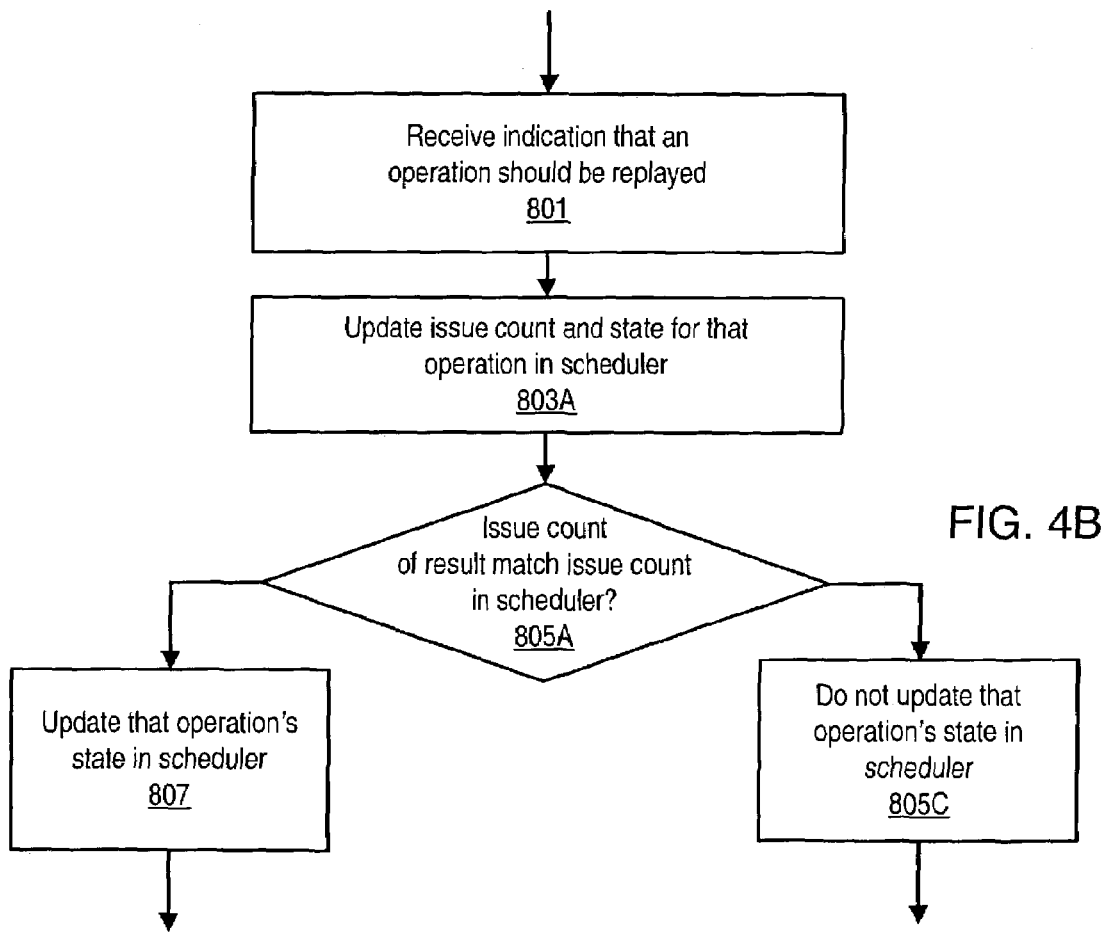
FIG. 4B is a flowchart of a method of inhibiting an update to the state of an incorrectly speculated operation within the scheduler, according to another embodiment.

FIG. 4B illustrates another embodiment of a method of inhibiting updates to the scheduler state of an operation due to completion of an instance of that operation that was already in-flight within a functional unit before the need to replay that operation was detected. As in FIG. 4A, the need to replay the operation is detected at 801 and the state of the operation is responsively updated within the scheduler at 803A. Additionally, an issue count or other means for differentiating instances of operations within the scheduler may be modified in response to detecting the incorrect data speculation for the operation, as indicated at 803A. Whenever an instance of the operation completes execution, the issue count associated with that instance may be compared to the issue count associated with the operation in the scheduler, as indicated at 805A. If the two issue counts match, the operation's state within the scheduler may be updated in response to completion of the operation, as shown at 807. For example, the operation's state may be updated to indicate that the operation has completed execution. If the two issue counts do not match, the operation's state may not be updated, as shown at 805B. Accordingly, the instance of the operation that completed execution based on incorrect data speculation is differentiated from the instance of the operation that should be reissued to execute without the incorrect data speculation. This differentiation allows the update to the state of the operation to be inhibited in response to completion of the instance of the operation that executed with an incorrect data value.

Exemplary Computer Systems

Figure 5:
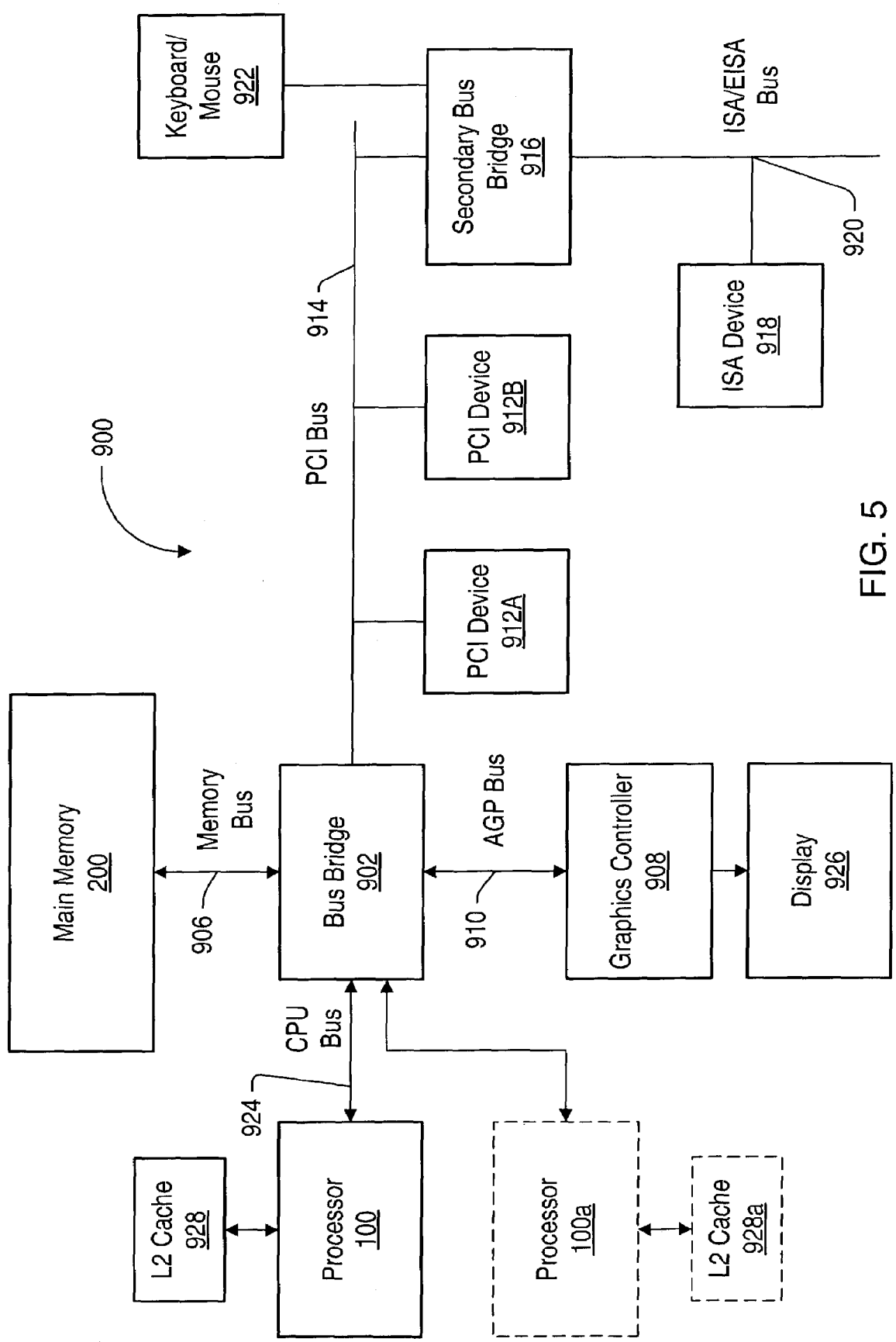
FIG. 5 shows an exemplary computer system, according to one embodiment.

FIG. 5 shows a block diagram of one embodiment of a computer system 900 that includes a processor 100 coupled to a variety of system components through a bus bridge 902. Processor 100 may include replay detection units and a scheduler configured to replay operations as described above. Other embodiments of a computer system are possible and contemplated. In the depicted system, a main memory 200 is coupled to bus bridge 902 through a memory bus 906, and a graphics controller 908 is coupled to bus bridge 902 through an AGP bus 910. Several PCI devices 912A-912B are coupled to bus bridge 902 through a PCI bus 914. A secondary bus bridge 916 may also be provided to accommodate an electrical interface to one or more EISA or ISA devices 918 through an EISA/ISA bus 920. In this example, processor 10 is coupled to bus bridge 902 through a CPU bus 924 and to an optional L2 cache 928. In some embodiments, the processor 100 may include an integrated L1 cache (not shown).

Bus bridge 902 provides an interface between processor 100, main memory 200, graphics controller 908, and devices attached to PCI bus 914. When an operation is received from one of the devices connected to bus bridge 902, bus bridge 902 identifies the target of the operation (e.g., a particular device or, in the case of PCI bus 914, that the target is on PCI bus 914). Bus bridge 902 routes the operation to the targeted device. Bus bridge 902 generally translates an operation from the protocol used by the source device or bus to the protocol used by the target device or bus.

In addition to providing an interface to an ISA/EISA bus for PCI bus 914, secondary bus bridge 916 may incorporate additional functionality. An input/output controller (not shown), either external from or integrated with secondary bus bridge 916, may also be included within computer system 900 to provide operational support for a keyboard and mouse 922 and for various serial and parallel ports. An external cache unit (not shown) may also be coupled to CPU bus 924 between processor 100 and bus bridge 902 in other embodiments. Alternatively, the external cache may be coupled to bus bridge 902 and cache control logic for the external cache may be integrated into bus bridge 902. L2 cache 928 is shown in a backside configuration to processor 100. It is noted that L2 cache 928 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 912A-912B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 918 is illustrative of various types of peripheral devices, such as a modem, a sound card, and a variety of data acquisition cards such as GPIB or field bus interface cards.

Graphics controller 908 is provided to control the rendering of text and images on a display 926. Graphics controller 908 may embody a typical graphics accelerator generally known in the art to render three-dimensional data structures that can be effectively shifted into and from main memory 200. Graphics controller 908 may therefore be a master of AGP bus 910 in that it can request and receive access to a target interface within bus bridge 902 to thereby obtain access to main memory 200. A dedicated graphics bus accommodates rapid retrieval of data from main memory 200. For certain operations, graphics controller 908 may further be configured to generate PCI protocol transactions on AGP bus 910. The AGP interface of bus bridge 902 may thus include functionality to support both AGP protocol transactions as well as PCI protocol target and initiator transactions. Display 926 is any electronic display upon which an image or text can be presented. A suitable display 926 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 900 may be a multiprocessing computer system including additional processors (e.g., processor 100a shown as an optional component of computer system 900). Processor 10a may be similar to processor 100. More particularly, processor 100a may be an identical copy of processor 100. Processor 100a may be connected to bus bridge 902 via an independent bus (as shown in FIG. 5) or may share CPU bus 924 with processor 100. Furthermore, processor 100a may be coupled to an optional L2 cache 928a similar to L2 cache 928.

Figure 6:
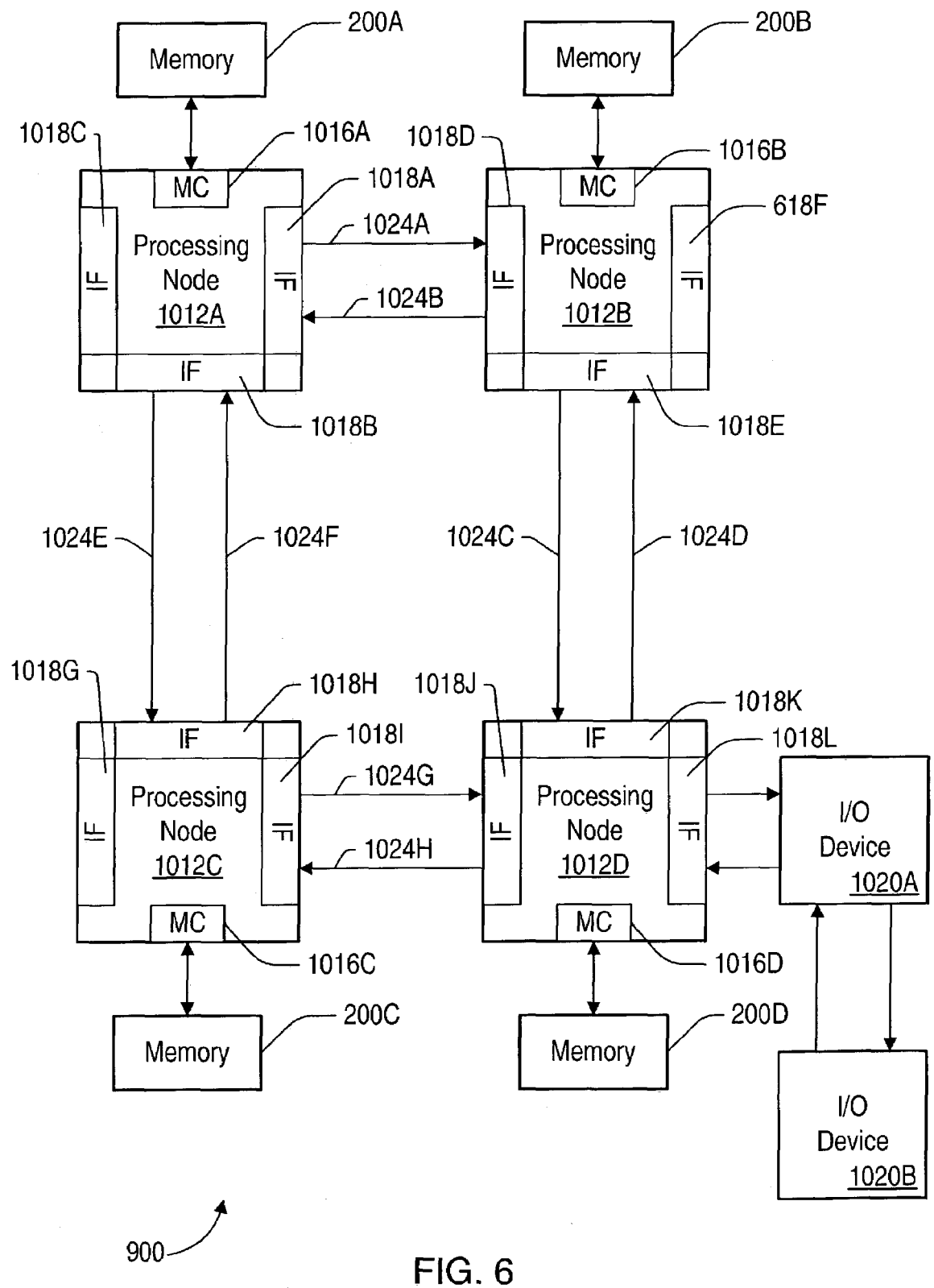
FIG. 6 shows another exemplary computer system, according to another embodiment.

Turning now to FIG. 6, another embodiment of a computer system 900 that may include a processor 100 having one or more replay detection units and a scheduler configured to replay operations as described above is shown. Other embodiments are possible and contemplated. In the embodiment of FIG. 6, computer system 900 includes several processing nodes 1012A, 1012B, 1012C, and 1012D. Each processing node is coupled to a respective memory 200A-200D via a memory controller 1016A-1016D included within each respective processing node 1012A-1012D. Additionally, processing nodes 1012A-1012D include interface logic used to communicate between the processing nodes 1012A-1012D. For example, processing node 1012A includes interface logic 1018A for communicating with processing node 1012B, interface logic 1018B for communicating with processing node 1012C, and a third interface logic 1018C for communicating with yet another processing node (not shown). Similarly, processing node 1012B includes interface logic 1018D, 1018E, and 1018F; processing node 1012C includes interface logic 1018G, 1018H, and 1018I; and processing node 1012D includes interface logic 1018J, 1018K, and 1018L. Processing node 1012D is coupled to communicate with a plurality of input/output devices (e.g., devices 1020A-1020B in a daisy chain configuration) via interface logic 1018L. Other processing nodes may communicate with other I/O devices in a similar fashion.

Processing nodes 1012A-1012D implement a packet-based link for inter-processing node communication. In the present embodiment, the link is implemented as sets of unidirectional lines (e.g., lines 1024A are used to transmit packets from processing node 1012A to processing node 1012B and lines 1024B are used to transmit packets from processing node 1012B to processing node 1012A). Other sets of lines 1024C-1024H are used to transmit packets between other processing nodes as illustrated in FIG. 6. Generally, each set of lines 1024 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 1012A to processing node 1012D may pass through either processing node 1012B or processing node 1012C as shown in FIG. 6. Any suitable routing algorithm may be used. Other embodiments of computer system 900 may include more or fewer processing nodes then the embodiment shown in FIG. 6.

Generally, the packets may be transmitted as one or more bit times on the lines 1024 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 1012A-1012D, in addition to a memory controller and interface logic, may include one or more processors. Broadly speaking, a processing node comprises at least one processor and may optionally include a memory controller for communicating with a memory and other logic as desired. More particularly, each processing node 1012A-1012D may include one or more copies of processor 100. External interface unit may include the interface logic 1018 within the node, as well as the memory controller 1016.

Memories 200A-200D may comprise any suitable memory devices. For example, a memory 200A-200D may comprise one or more RAMBUS DRAMs (RDRAMs), synchronous DRAMs (SDRAMs), static RAM, etc. The address space of computer system 900 is divided among memories 200A-200D. Each processing node 1012A-1012D may include a memory map used to determine which addresses are mapped to which memories 200A-200D, and hence to which processing node 1012A-1012D a memory request for a particular address should be routed. In one embodiment, the coherency point for an address within computer system 900 is the memory controller 1016A-1016D coupled to the memory storing bytes corresponding to the address. In other words, the memory controller 1016A-1016D is responsible for ensuring that each memory access to the corresponding memory 200A-200D occurs in a cache coherent fashion. Memory controllers 1016A-1016D may comprise control circuitry for interfacing to memories 200A-200D. Additionally, memory controllers 1016A-1016D may include request queues for queuing memory requests.

Interface logic 1018A-1018L may comprise a variety of buffers for receiving packets from the link and for buffering packets to be transmitted upon the link. Computer system 900 may employ any suitable flow control mechanism for transmitting packets. For example, in one embodiment, each interface logic 1018 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 1020A-1020B may be any suitable I/O devices. For example, I/O devices 1020A-1020B may include devices for communicate with another computer system to which the devices may be coupled (e.g., network interface cards or modems). Furthermore, I/O devices 1020A-1020B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

The above discussion describes signals as being "asserted". A signal may be defined as being asserted when it conveys a value indicative of a particular piece of information. A particular signal may be defined to be asserted when it conveys a binary one value or, alternatively, when it conveys a binary zero value.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
    one or more functional units, each configured to execute operations;
    a scheduler configured to issue each of a plurality of operations for execution by one of the one or more functional units, wherein the scheduler is configured to maintain state information for each of the plurality of operations, wherein the state information indicates whether an associated operation has completed execution; and
    a replay detection unit configured to detect that one of the plurality of operations should be replayed, wherein to detect that one of the plurality of operations should be replayed the replay detection unit is configured to determine that the one of the plurality of operations is dependent on another operation to be replayed, wherein the replay detection unit is configured to inhibit an update to the state information for the one of the plurality of operations in response to execution of an instance of the one of the plurality of operations if the instance of the one of the plurality of operations is currently being executed by one of the one or more functional units when the one of the plurality of operations is detected as needing to be replayed.

2. The microprocessor of claim 1, wherein the replay detection unit is configured to inhibit the update to the state information for the one of the operations by causing the one of the functional units executing the instance of the operation to not signal completion of the instance of the operation to the scheduler.

3. The microprocessor of claim 1, wherein the replay detection unit is configured to inhibit the update to the state information for the one of the operations by causing the scheduler to modify an issue count associated with the one of the operations, wherein the scheduler is configured to not update the state information in response to completion of the instance of the operation if the issue count of the operation does not match an issue count of the instance of the operation.

4. The microprocessor of claim 1, wherein in response to a data speculation verification unit detecting incorrect data speculation for the one of the plurality of operations, the scheduler is configured to update the state information associated with the one of the plurality of operations to indicate that the associated operation needs to be reissued.

5. The microprocessor of claim 4, wherein if an instance of the one of the plurality of operations is being executed by one of the one or more functional units when the incorrect data speculation is detected, the replay detection unit is configured to ensure that the state information associated with the one of the plurality of operations continues to indicate that the associated operation needs to be reissued after completion of execution of the instance of the one of the operations.

6. The microprocessor of claim 1, further comprising a plurality of replay detection units.

7. The microprocessor of claim 1, wherein the replay detection unit is included in a data speculation verification unit configured to verify data speculation performed on the one of the plurality of operations, and wherein the data speculation verification unit is configured to provide an indication of a need to replay the one of the plurality of operations to the scheduler in response to detecting incorrect data speculation for the one of the plurality of operations.

8. The microprocessor of claim 7, wherein the data speculation verification unit is included in one of the functional units configured to verify data predictions.

9. The microprocessor of claim 7, wherein the data speculation verification unit is included in one of the functional units configured to perform load and store operations, wherein the data speculation verification unit is configured to verify dependency predictions.

10. The microprocessor of claim 1, wherein the replay detection unit is included in the scheduler, wherein the replay detection unit is configured to detect that one of the plurality of operations should be replayed in response to a source operand of the one of the plurality of operations being rebroadcast on a result bus.

11. The microprocessor of claim 1, wherein the scheduler is configured to update the state information associated with the one of the plurality of operations to indicate that the associated operation needs to be reissued in response to receiving an indication of the need to replay the one of the plurality of operations.

12. A computer system, comprising:
a memory; and
a processor coupled to the memory and comprising:
one or more functional units, each configured to execute operations;
a scheduler configured to issue each of a plurality of operations for execution by one of the one or more functional units, wherein the scheduler is configured to maintain state information for each of the plurality of operations, wherein the state information indicates whether an associated operation has completed execution; and
a replay detection unit configured to detect that one of the plurality of operations should be replayed, wherein to detect that one of the plurality of operations should be replayed the replay detection unit is configured to determine that the one of the plurality of operations is dependent on another operation to be replayed, wherein the replay detection unit is configured to inhibit an update to the state information for the one of the plurality of operations in response to execution of an instance of the one of the plurality of operations if the instance of the one of the plurality of operations is currently being executed by one of the one or more functional units when the one of the plurality of operation is detected as needing to be replayed.

13. The computer system of claim 12, wherein the replay detection unit is configured to inhibit the update to the state information for the one of the operations by causing the one of the functional units executing the instance of the operation to not signal completion of the instance of the operation to the scheduler.

14. The computer system of claim 12, wherein the replay detection unit is configured to inhibit the update to the state information for the one of the operations by causing the scheduler to modify an issue count associated with the one of the operations, wherein the scheduler is configured to not update the state information in response to completion of the instance of the operation if the issue count of the operation does not match an issue count of the instance of the operation.

15. The computer system of claim 12, wherein in response to a data speculation verification unit detecting incorrect data speculation for the one of the plurality of operations, the scheduler is configured to update the state information associated with the one of the plurality of operations to indicate that the associated operation needs to be reissued.

16. The computer system of claim 15, wherein if an instance of the one of the plurality of operations is being executed by one of the one or more functional units when the incorrect data speculation is detected, the replay detection unit is configured to ensure that the state information associated with the one of the plurality of operations continues to indicate that the associated operation needs to be reissued after completion of execution of the instance of the one of the operations.

17. The computer system of claim 12, wherein the replay detection unit is included in a data speculation verification unit configured to verify data speculation performed on the one of the plurality of operations, and wherein the data speculation verification unit is configured to provide an indication of a need to replay the one of the plurality of operations to the scheduler in response to detecting incorrect data speculation for the one of the plurality of operations.

18. The computer system of claim 12, wherein the replay detection unit is included in the scheduler, wherein the replay detection unit is configured to detect that one of the plurality of operations should be replayed in response to a source operand of the one of the plurality of operations being rebroadcast on a result bus.

19. The computer system of claim 12, wherein the scheduler is configured to update the state information associated with the one of the plurality of operations to indicate that the associated operation needs to be reissued in response to receiving an indication of the need to replay the one of the plurality of operations.

20. A microprocessor, comprising:
issuing an instance of an operation for execution;
subsequent to said issuing and during executing of the instance of the operation, determining that the operation is dependent on another operation to be replayed and that the operation should therefore also be replayed;

prior to completion of the instance of the operation, receiving an indication that the operation should be replayed;

in response to said receiving, inhibiting an update to a state of the operation in a scheduler in response to completion 0f the instance of the operation.

21. The method of claim 20, wherein said inhibiting comprises causing a functional unit executing the instance of the operation to not signal completion of the instance of the operation to the scheduler.

22. The method of claim 20, wherein said inhibiting comprises:

the scheduler modifying an issue count associated with the operation in response to receiving the indication that the operation should be replayed; and the scheduler not updating the state information associated with the operation in response to completion of the instance of the operation if the issue count of the operation does not match an issue count of the instance of the operation.

23. The method of claim 20, further comprising the scheduler updating the state information associated with the operation to indicate that the operation needs to be reissued in response to receiving the indication that the operation should be replayed.

24. The method of claim 20, further comprising a data speculation verification unit generating the indication that the operation should be replayed in response to detecting that incorrect data speculation was performed on the operation.

25. The method of claim 20, further comprising the scheduler generating the indication that the operation should be replayed in response to a source operand of the operation being rebroadcast on a result bus.

26. A microprocessor, comprising:

means for issuing an instance of an operation for execution;

means for executing the instance of the operation; and means for detecting that the operation should be replayed, wherein said means for detecting is configured to determine that the operation should be replayed if the means for detecting determines that the operation is dependent on another operation to be replayed, wherein said means for detecting is configured to inhibit an update to a state of the operation in the means for issuing in response to completion of the instance of the operation if the instance of the operation is issued prior to said detecting and is currently being executed when said means for detecting detects that the operation should be replayed.

* * * * *